United States Patent [19]

Lebre et al.

[11] Patent Number: 5,405,235
[45] Date of Patent: Apr. 11, 1995

[54] BARREL GRASPING DEVICE FOR AUTOMATICALLY CLAMPING ONTO THE POLE OF A BARREL TROLLEY

[76] Inventors: Charles J. P. Lebre, 35 rue de l'Orangeric, F-91700 Sainte Genevieve Des Bois; Chrisotphe Lebre, 5 Square du Velay, F-75013 Paris, both of France

[21] Appl. No.: 918,103

[22] Filed: Jul. 24, 1992

[30] Foreign Application Priority Data

Jul. 26, 1991 [FR] France .................. 91 09487

[51] Int. Cl.⁶ .................. B60D 1/04; B25B 1/00; B62B 1/00
[52] U.S. Cl. .................. 414/490; 280/47.27; 280/47.24; 294/90
[58] Field of Search .............. 414/490, 402, 373, 607, 414/467, 555, 622, 606, 607, 618, 450–456, 910–911; 280/47.24, 47.17, 47.28, 47.29, 47.27; 254/8 B, 2 R; 294/90

[56] References Cited

U.S. PATENT DOCUMENTS

| 3,310,336 | 3/1967 | Chenault .................. 294/90 |
| 4,257,729 | 3/1981 | Morissette .................. 414/490 |
| 4,741,659 | 5/1988 | Berg .................. 414/450 |
| 4,902,187 | 2/1990 | Rousseau .................. 414/490 |
| 4,981,412 | 1/1991 | Hawkins .................. 280/47.27 |

FOREIGN PATENT DOCUMENTS

| 1571305 | 5/1969 | France .................. 280/47.24 |
| 2610271 | 8/1988 | France .................. 280/47.24 |
| 613574 | 11/1948 | United Kingdom .............. 280/47.24 |

Primary Examiner—Michael S. Huppert
Assistant Examiner—R. B. Johnson
Attorney, Agent, or Firm—William A. Drucker

[57] ABSTRACT

A barrel grasping device with upper and lower jaws pivoted to a double yoke surrounding the pole of a barrel trolley. An auxiliary yoke imprisoning a clamping plate is slidingly mounted on the pole above a double yoke and is connected to the latter by a compression spring. A connecting rod is pivoted at one end to the double yoke and at its intermediate portion to a lever having one extremity pivoted to the auxiliary yoke around an off-set axis and engaging a clamping plate. The weight of the barrel transmitted by the jaws to the double yoke automatically pulls the connecting rod, causing the lever to pivot and push the clamping plate against the pole, thus clamping the device along the pole of the barrel trolley.

4 Claims, 3 Drawing Sheets

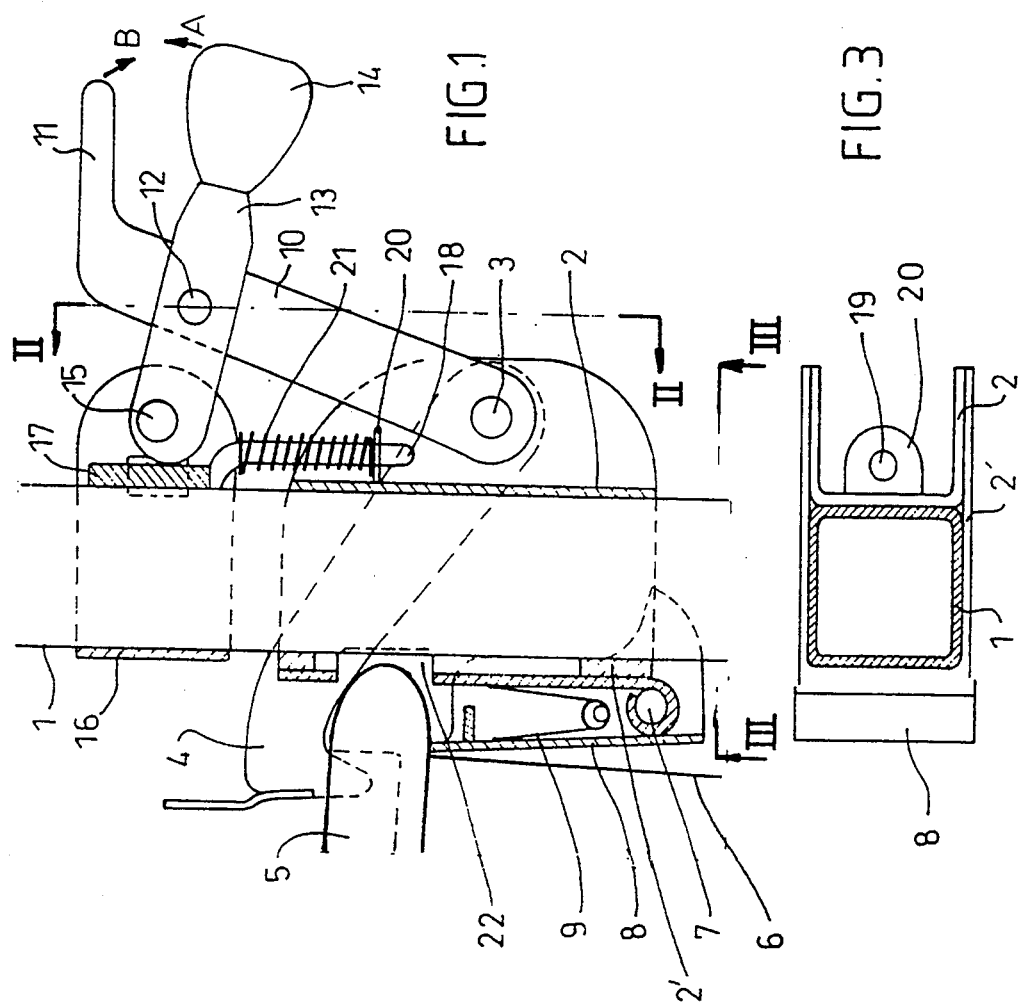

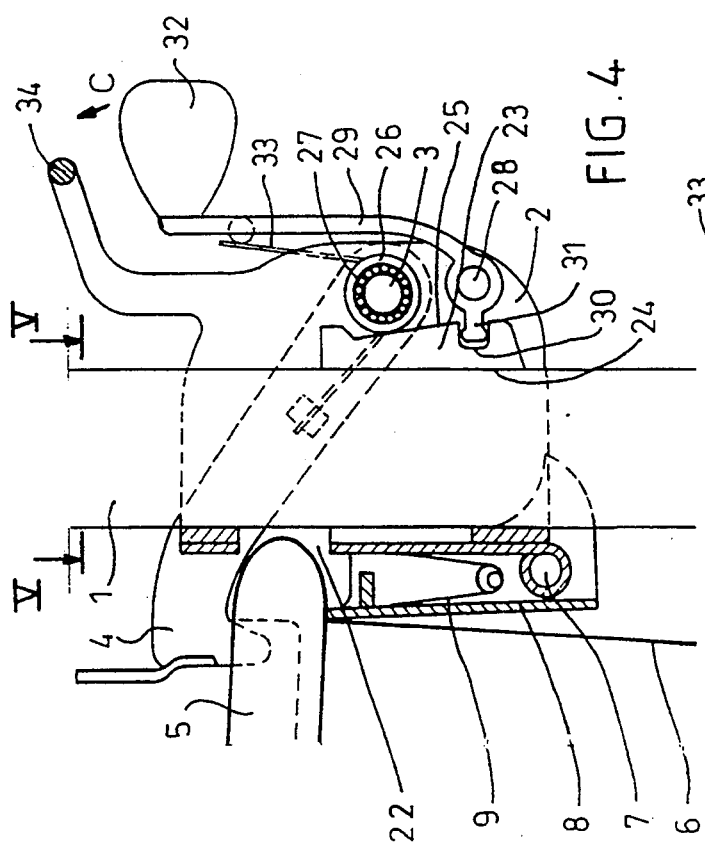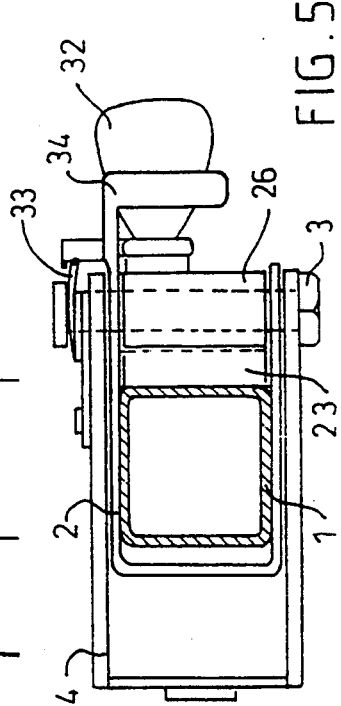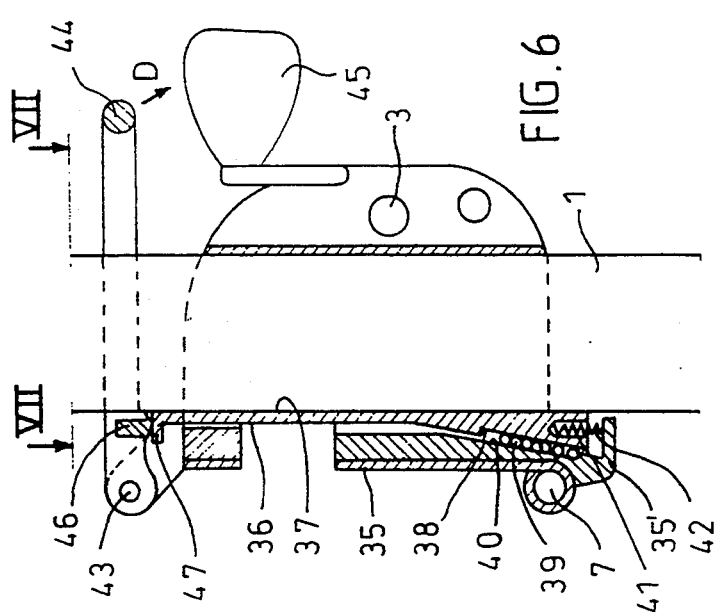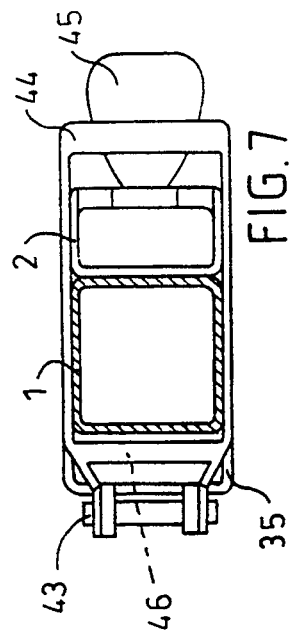

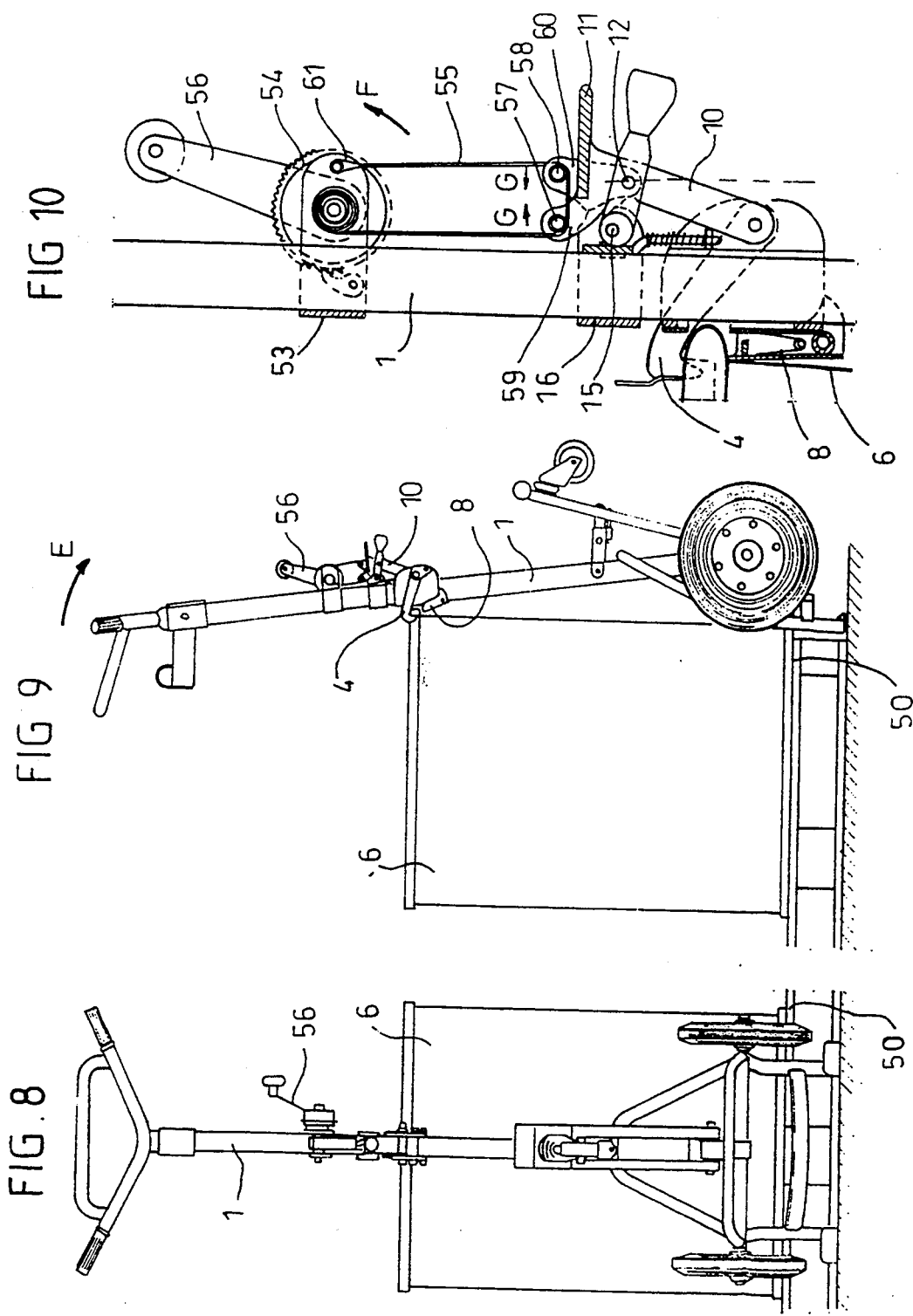

BARREL GRASPING DEVICE FOR AUTOMATICALLY CLAMPING ONTO THE POLE OF A BARREL TROLLEY

FIELD OF THE INVENTION

The invention concerns a barrel trolley and in particular a barrel trolley of the type described in the documents FR-A-2 610 271 and FR-A-2 659 615 of the same applicant.

BACKGROUND OF THE INVENTION

In this already known type of barrel trolley, a device is provided for gripping the barrel via the locking of two jaws acting simultaneously. The only disposition used to date concerning all known types of trolleys or carriages for the movement of barrel involves one of these hook-shaped jaws acting on the inside of the upper diameter of the barrel and the other lower jaw taking support under the circular relief of this diameter, thus avoiding the engagement of fastening hooks or a support under the lower circumference of the barrel.

In the documents FR-A-2 610 271 and FR-A-2 659 615 mentioned above, the immobilization of the gripping device on the pole of the barrel is effected by a calibrated static clamping provided by a cam integral with a lever for its manual activation. If this device operates efficiently, the tolerances need to be relatively precise concerning the section of the tube constituting the pole, as well as the two elements cooperating with the cam when clamping is effected on the pole of the trolley, which is not obvious during mounting, and passage from the top of the cam at the end of the clamping operation being required so as to obtain effectiveness.

SUMMARY OF THE INVENTION

The purpose of the present invention is to overcome this drawback and with this end in view, the invention is able to equip the already known barrel trolley of the above mentioned type with an automatic immobilization system not requiring the use of a cam clamping device.

To this effect, the immobilization device of the invention includes a flat-shaped clamping member mounted inside the yoke unit to which the jaws are joined and is selectively applied against the pole of the trolley under the effect of an activating member, this activating member being borne by the yoke unit so that, when the load of the trolley is transferred to the jaws, it is automatically submitted to a displacement resulting from a thrust force exerted on said clamping member in a direction roughly perpendicular to the pole.

According to one embodiment, said jaws for gripping the trolley are joined to a main shaft, whereas the clamping member is mounted inside an auxiliary yoke surrounding the pole above the main barrel and is elastically connected to the latter by a compression spring. A connecting rod is joined to a main yoke and to the intermediate portion of a thrust lever with one extremity being joined to the auxiliary yoke and engaging the clamping member. The transfer of the weight of the trolley onto the main yoke confers on the connecting rod a movement automatically controlling the application by means of the thrust lever acting as a load reducing gear exerting a significant thrust force on the clamping member, thus ensuring the effective immobilization of the device along the pole.

Linking by means of the compression spring between the main yoke and the auxiliary yoke generates between these two yokes a relative movement in a direction ensuring that the clamping member is applied against the pole. A manual thrust exerted on the handle extending the thrust lever makes it possible to annul the action of the compression spring so that, in the absence of any load, the device can be freely moved along the pole and thus adjust the position of the jaws according to the height of the barrel.

According to another embodiment of the device of the invention, the clamping member is mounted inside the yoke to which the jaws are joined and the clamping member has one flat face for being applied against the pole and one opposing ramp-shaped face cooperating with at least one rolling member linked to the yoke. The transfer of the load to the jaws automatically provokes a relative movement of the ramp of the clamping member and the rolling member in a direction which applies the clamping member against the pole and ensures immobilization of the grasping device.

A spring acts on the clamping member so as to move the latter in a direction causing it to be applied against the pole and so as to ensure a static immobilization of the device along the pole in the absence of any load. A lever joined to the yoke and cooperating with the clamping member has been designed so as to receive a manual thrust from the user, said thrust moving the member along the pole in a direction opposing the action of said spring, thus annuling in the absence of any load the static clamping effect and allowing for the easy movement of the device along the pole.

According to one variant, the device of the invention allows for the picking up of a barrel disposed on a pallet when it is impossible to press the base of the trolley on the upper face of the pallet and when this base needs to be then pressed on the ground. In this case, after picking up of the barrel and slanting of the trolley so as to support it on its wheels, lowering of the barrel to the ground may be ensured by a controlled sliding of said barrel along the trolley.

Thus, fixed at a suitable height on the pole of the trolley above the automatic clamping device is a winch acting on a windable element, such as a belt, a chain, a synchronous belt or similar element, from which the members of the automatic clamping device are suspended. Thus, the transfer of the load of the barrel onto the jaws provokes the tension of the windable element which acts on the suspension members so as to neutralize automatic clamping and, by unwinding the winch, allows for the controlled lowering of the barrel to the ground via sliding along the pole.

BRIEF DESCRIPTION OF THE DRAWINGS

So as to clearly understand the automatic immobilization device for a barrel trolley of the invention, there now follows non-restrictive examples of preferred embodiments with reference to the accompanying drawing on which:

FIG. 1 is a longitudinal cutaway view of the double-jaw grasping device equipping a barrel trolley of the type described in the document FR-A-2 610 271 and provided with a first embodiment of the immobilization system of the present invention, FIG. 2 is a longitudinal cutaway view taken along the line II—II of FIG. 1, FIG. 3 is a partial horizontal cutaway view taken along the line III—III of FIG. 1, FIG. 4 is a longitudinal cutaway view of the double jaw grasping device equipping a barrel trolley of the type described in the document FR-A-2 610 271 and provided with a second embodiment of the immobilization system of the present invention, FIG. 5 is a horizontal cutaway view taken along the line V—V of FIG. 4, FIG. 6 is a view corresponding to FIG. 4 of the double jaw grasping device equipped with another embodiment of the immobilization system, FIG. 7 is a horizontal cutaway view taken along the line VII—VII of FIG. 6, FIG. 8 is a front view of a barrel trolley equipped with a variant of the device of FIG. 1 enabling a barrel to be placed on a pallet, FIG. 9 is a side view of the barrel trolley of FIG. 8, and FIG. 10 is a detailed view on larger scale showing the automatic clamping and controlled release mechanism equipping the trolley of FIGS. 8 and 9.

DETAILED DESCRIPTION OF THE PREFERRED EMBODIMENTS

FIGS. 1 to 3 show a barrel gripping device equipping a trolley type carriage of the type described in detail in the document FR-A-2 610 271. As can be seen, a double yoke 2,2' is mounted to slide freely on the vertical pole 1 of the trolley and surrounds the pole 1, thus forming a sheath. The double yoke 2, 2' bears towards the rear a transversal axis 3 to which joined is the hook-shaped upper jaw 4 which is engaged (under the action of a return spring not shown on the drawing) inside the vertical relief 5 formed by the upper edge of the barrel 6. On the front face of the double yoke 2,2' at its lower part, the lower jaw 8 forced back by the barrel 6 is joined around an axis 7 against the action of the spring 9 until said jaw is engaged under the relief 5.

The system for immobilizing the grasping device on the pole 1 of the trolley, which in particular is the subject of the present application, comprises according to the embodiment shown on FIGS. 1 to 3 a connecting rod joined at its lower extremity to the double yoke 2,2' around the hinge pin 3 of the jaw 4. The connecting rod 10 is terminated by a horizontal upper portion 11 and is joined at its intermediate portion around an axis 12 to the intermediate portion of a lever 13. This lever 13 has at one extremity, disposed opposite the portion 11 of the connecting rod 10, a handle 14 to be gripped manually, whereas its opposite extremity comprises an articulation hole to allow for its oscillating mounting around an axis 15 on an auxiliary yoke 16 disposed above the double yoke 2,2' which overlaps the pole 1 so as to be able to slide freely along the latter. The extremity of lever 13 opposite the handle 14 is off-set with relation to axis 15 so as to constitute a cam portion acting on a clamping plate 17 mounted and contained within the yoke 16 close to the pole 1.

The linking between the plate 17 and the double jaw grasping device is ensured by a rod 18 integral with the lower extremity of the plate 17 and which is engaged inside an opening 19 of a fastening block 20 projecting onto the double yoke 2,2'. A spring 21, in support at its upper portion on the base of the plate 17 and in free compression against the block 20, is mounted on the rod 18.

The barrel 6 to be picked up resting on the ground, the lower jaw 8 of the trolley is introduced under the upper relief 5 of the barrel while being pivoted in the clockwise direction about axis 7. The upper jaw 4 is pivoted in the anti-clockwise direction about axis 3 to engage inside the relief 5 of barrel 6. The barrel being thus locked between said lower jaw 8 and said upper jaw 4, the pole 1 of the trolley is slanted in the clockwise direction, that transfers the load of the barrel 6 from the ground to the lower jaw 8 and thus to yoke 2 which is urged downwardly. The connecting rod 10, which is pivoted to yoke 2, is consequently urged downwardly and, since lever 13 is connected to connecting rod 10 through pin 12, said lever 13 is pivoted in the clockwise direction about axis 15. The cam portion of lever 13 thus presses plate 17 against the pole 1 (towards the left when looking at FIG. 1) that causes immediate immobilization along pole 1 of the unit constituted by the yokes 16 and 2,2'.

The spring 21 acts as a pre-clamping spring whose role, when no load is applied to the jaws 4 and 8, is by means of static clamping of keeping the device in position along the pole 1. So as to adjust the position of the device along the pole 1 and be adapted to the height of the barrel 6 to be picked up, it merely suffices for the user to simultaneously act with one hand on the handle 14 and the portion 11 of the connecting rod by applying to these two elements thrust forces directed respectively along the arrows A and B so as to annul the pre-clamping effect. Then, the simple fact of releasing these two handles by slightly pulling them upwards for placing in contact the lower jaw with the base of the circumferential relief of the barrel ensures the automatic and infallible implementation of the grasping device for immobilizing the barrel on the pole.

There currently exist a large number of barrels with a large number of differences as regards the relief circumference of the outer diameter of barrels. So as to facilitate the conception and reduce the margins of play for this diameter to be gripped by the jaws, a perforation is provided in the sliding yoke 2' of the gripping device, said perforation having a relatively large clearance between the front faces of the yoke 2' and of the pole 1. This perforation 22 allows for relatively large penetration of the outer diameter of the barrel 6 which thus directly takes support against the pole 1.

FIGS. 4 and 5 show a second embodiment of the immobilization system of the invention. A piece 23 is kept inside the double yoke 2 and has one face 24 in contact with the pole 1 and which may comprise a latching so as to minimize its support surface in contact with the pole and thus increase its pressure to the mm2. The opposing portion of the piece 23 forms a ramp 25 with an angle able to vary of about between 5 and 15 degrees and which cooperates with a roller 26 mounted on the spindle 3 by means of a needle roller bearing 27 so as to be able to completely rotate freely. With the barrel 6 in support on the ground, when the jaws 4, 8 are locked onto the relief 5 of this barrel and the pole 1 of the trolley is slanted towards the rear, the weight of the barrel is transferred to the yoke 2 which provokes a slight movement downwards of the roller 26 onto the ramp 25 and thus, via a wedge effect, causes the automatic clamping of the piece 23 against the pole 1 and immobilization of the double jaw device 4, 8 on the pole 1.

Mounted pivoting around a spindle 28 at the lower portion of the yoke 2 is a lever 29 with its lower extremity 30 being engaged in a notch 31 of the rear face of the piece 23 and its upper extremity being provided with a handle 32 to be picked up manually. A kickover spring 33 disposed around the spindle 3 acts firstly on the hook-shaped jaw 4 in a direction keeping this jaw in the relief 5 of the barrel 6, and secondly on the lever 29 in a direction spacing the handle 32 from the yoke 2. A member 34 integral with the yoke 2 is opposite the handle 32 above the latter.

In the absence of any load, the keeping of constant pressure of the piece 23 is obtained with the aid of the lever 29 which, under the effect of the spring 33, keeps the device with the double jaws 4 and 8 stopped on the pole 1. After having released the jaws 4 and 8 from cooperating with the shaft 6, it merely suffices for a user to pick up with his hand the handle 32 and the member 34 and carry out a clamping action by pushing the handle 32 in the direction of the arrow C so as to relieve the conical piece 23 from its contact with the pole 1 and the roller 26 and (in the absence of any load) allow for a complete free movement of the device along the pole 1, thus enabling the pole to be instantly adapted to the various heights of barrels.

In another embodiment shown on FIGS. 6 and 7 and on which for the sake of clarity of the drawing the jaws 4 and 8 and the barrel 6 have not been shown, the yoke 2 only surrounds the pole 1 on three sides including the rear side. Another yoke 35 also surrounds the pole 1 on three sides, including the front side, and the assembling of the yokes 2 and 35 constitutes a sliding sheath on the pole 1. A clamping piece 36 is imprisoned inside the yoke 35 and has one flat face disposed opposite the front face of the pole 1. The opposing face of the piece 36 has one ramp-shaped portion on which a needle track 39 is able to move in cooperation with a parallel track 40 provided in the yoke 35. The transfer onto the yoke unit 2 and 35 of the load of the barrel locked by the jaws (not shown) of the device provokes a relative movement of the yoke 35 and of the piece 36 provoking the clamping of the latter against the pole 1 and immobilization of the device along the pole.

Fitted at the lower portion of the piece 36 is a dummy housing 41 inside which disposed is a compression spring 42 whose extremity projects outside the housing 41 and rests on one portion 35' of the yoke 35. Joined to the upper extremity of the yoke 35 around a spindle 43 is a bar 44 opposite a handle 45 integral with the yoke 2. An actuation portion 46 borne by the bar 44 is able to selectively engage the upper extremity 47 of the piece 36.

The keeping in constant pressure of the conical ramp piece 36 between the pole and the bed of needles 39 is effected by the spring 42 which ensures immobilization of the device along the pole. In the absence of any load, the simple action of picking up by the user of the bar 44 and the manual clamping of the latter in the direction of the arrow D against the handle 45 is sufficient so as to free the piece 36 from its contact with the pole 1 and the track of needles 39 and allow for a complete free movement of the device along the pole.

FIGS. 8 to 10 show a barrel trolley equipped with the automatic grasping device of FIGS. 1 to 3 and intended for the picking up of a barrel 6 from a pallet 50 at a certain height with respect to the ground.

To this effect, secured to the pole 1 at a suitable height above the auxiliary yoke 16 is a support 53 for a winch 54 on the drum of which winds a belt 55 via the activation of a crank 56. The belt 55 passes under the transverse axes 57 and 58 respectively of two opposing yokes 59 and 60 and its free extremity 61 is secured to the support 53. The yoke 59 is constituted by an extension of the connecting rod 10 and the yoke 60 is joined to the hinge pin 12 of the lever 13 and rests on the the cam portion of lever 13.

In order to pick up the barrel 6 located on the edge of the pallet 50, the trolley with its base is placed on support on the ground (as shown on FIGS. 8 and 10) so that the jaws 8 and 4 pick up the edge of the barrel. As soon as the pole 1 of the trolley has been tilted in the direction of the arrow E of FIG. 9, the load of the barrel has been transferred to the jaws 4 and 8, the resultant tension of the belt 55 brings together the two yokes 59 and 60 (direction of the arrows G—G of FIG. 10) by bringing nearer the handle 13 to the portion 11 of the connecting rod 10, which provokes cancellation of the self-clamping effect of the auxiliary yoke 16. The winch 54 then keeps the barrel 6 suspended and it merely suffices to turn the crank 56 of the winch in the direction of the arrow F of FIG. 10 so that the barrel 6 safely is lowered to the ground as quickly as possible.

The above-mentioned description has been given by way of non-restrictive example and additions or constructive modifications may be made without departing from the context of the invention. In particular, the winch used is a conventional known type of winch retained by friction and with a ratchet wheel (or any known stoppage device).

What is claimed is

1. A device combining the pole of a barrel trolley and a grasping element to which a barrel is suspended and which automatically clamps on said pole, said device comprising:
   (a) a hook-shaped upper jaw being part of said grasping element and adapted to co-act with an upper diameter of a barrel,
   (b) a lower jaw being part of said grasping element and adapted to be engaged under a circumferential relief of the barrel,
   (c) a yoke surrounding the pole of the barrel trolley so as to vertically slide along said pole, said upper jaw and said lower jaw being pivoted to said yoke,
   (d) an auxiliary yoke surrounding said pole above said yoke,
   (e) a clamping member mounted within said auxiliary yoke and engageable with said pole, a rod, a spring connection mounted between said yoke and auxiliary yoke, said clamping member being integral with said rod and being surrounded by said spring connection, said spring connection acting to force said auxiliary yoke away from said yoke, and
   (f) a lever, a connecting rod pivoted to the yoke and to an intermediate portion of said lever, said lever having one end pivotally mounted to the auxiliary yoke about an off-set pivot axis and engaging said clamping member, so that the weight of a barrel suspended by the grasping element acts on the yoke through the lower jaw to apply to said connecting rod a traction force causing said lever to pivot about its off-set axis for pressing said clamping member against said pole, thus ensuring effective immobilization of the yoke along the pole.

2. Device according to claim 1 wherein said spring connection between the yoke and the auxiliary yoke comprises a compression spring tending, in the absence of any load, to separate said yoke from said auxiliary yoke and cause said lever to press said clamping member against the pole.

3. Device according to claim 2 wherein said connecting rod and said lever have extensions adapted to be manually moveable, one towards the other, in the absence of any load to ensure a counter-balancing of the effect of said spring connection and allow for an easy vertical movement of the yoke along the pole.

4. Device according to claim 1 wherein a perforation is provided in a surface of said yoke above said lower jaw so as to provide a passage for an external relief of a large diameter presented by an upper end of the barrel to be picked up.

* * * * *